United States Patent
Christie et al.

(10) Patent No.: US 8,909,414 B2
(45) Date of Patent: Dec. 9, 2014

(54) THREE-DIMENSIONAL CORPOREAL FIGURE FOR COMMUNICATION WITH A PASSENGER IN A MOTOR VEHICLE

(75) Inventors: Cameron Christie, Palo Alto, CA (US); Yuval Appelboum, Thousand Oaks, CA (US); Gantimur Meissner, Berlin (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 957 days.

(21) Appl. No.: 12/636,881

(22) Filed: Dec. 14, 2009

(65) Prior Publication Data

US 2011/0144856 A1 Jun. 16, 2011

(51) Int. Cl.
| | | |
|---|---|---|
| *G01M 17/00* | (2006.01) | |
| *G06F 7/00* | (2006.01) | |
| *G06F 19/00* | (2011.01) | |
| *B60K 37/06* | (2006.01) | |
| *G01C 21/36* | (2006.01) | |
| *B60K 35/00* | (2006.01) | |
| *B60K 37/00* | (2006.01) | |
| *B60K 37/04* | (2006.01) | |

(52) U.S. Cl.
CPC ....... *G01C 21/3697* (2013.01); *B60K 2350/357* (2013.01); *B60K 37/06* (2013.01); *B60K 2350/352* (2013.01); *B60K 2350/1068* (2013.01); *B60K 2350/355* (2013.01); *B60K 2350/941* (2013.01); *G01C 21/3626* (2013.01); *B60K 35/00* (2013.01); *B60K 2350/1072* (2013.01); *B60K 2350/965* (2013.01); *B60K 2350/1024* (2013.01); *B60K 37/00* (2013.01); *B60K 2350/1044* (2013.01); *B60K 2350/948* (2013.01); *B60K 2350/108* (2013.01); *B60K 37/04* (2013.01)

USPC .......................................... 701/31.4; 701/32.7

(58) Field of Classification Search
USPC ............................................. 701/1, 31.4, 32.7
See application file for complete search history.

(56) References Cited

U.S. PATENT DOCUMENTS

| | | | | |
|---|---|---|---|---|
| 6,249,720 | B1 * | 6/2001 | Kubota et al. ..................... 701/1 |
| 6,429,846 | B2 * | 8/2002 | Rosenberg et al. ........... 345/156 |
| 6,959,166 | B1 * | 10/2005 | Gabai et al. ................... 434/308 |
| 7,294,060 | B2 * | 11/2007 | Ferrigno et al. ................ 463/43 |
| 2002/0116156 | A1 * | 8/2002 | Remboski et al. ............ 702/188 |
| 2006/0149428 | A1 | 7/2006 | Kim et al. ......................... 701/1 |
| 2007/0276582 | A1 * | 11/2007 | Coughlin ...................... 701/123 |
| 2008/0119994 | A1 | 5/2008 | Kameyama ..................... 701/48 |
| 2008/0269958 | A1 * | 10/2008 | Filev et al. ........................ 701/1 |
| 2008/0269978 | A1 * | 10/2008 | Shirole et al. .................. 701/30 |
| 2009/0034498 | A1 * | 2/2009 | Banerjea et al. .............. 370/338 |
| 2009/0144622 | A1 | 6/2009 | Evans et al. ................... 715/706 |

FOREIGN PATENT DOCUMENTS

| | | | |
|---|---|---|---|
| DE | 102005058227 A1 | 7/2006 | ............. B60R 16/02 |
| DE | 102007053470 A1 | 5/2008 | ............. B60R 16/02 |
| DE | 102007037073 A1 | 2/2009 | ............. B60K 35/00 |
| WO | 99/54015 | 10/1999 | ............. A63H 11/00 |

* cited by examiner

*Primary Examiner* — Imran Mustafa
(74) *Attorney, Agent, or Firm* — King & Spalding L.L.P.

(57) ABSTRACT

For a three-dimensional corporal figure for communicating with a passenger in a motor vehicle, wherein the three-dimensional corporal figure may be locked in place in the motor vehicle, it is in particular provided that a communication from a passenger and a driver of the motor vehicle, respectively, to the three-dimensional corporal figure is carried out acoustically and/or haptic, and that a communication from the three-dimensional corporal figure to a driver or a passenger of the motor vehicle is carried out optically and/or acoustically.

13 Claims, 4 Drawing Sheets

THREE-DIMENSIONAL CORPOREAL FIGURE FOR COMMUNICATION WITH A PASSENGER IN A MOTOR VEHICLE

TECHNICAL FIELD

The invention relates to a three-dimensional corporal figure for communicating with a passenger in a motor vehicle.

BACKGROUND

DE 10 2007 037 073 A1 discloses a device for communicating information to the driver of a motor vehicle, wherein a control device and a pointing device controlled by the control device is provided which is formed as a humanoid figure. The humanoid figure has direction indicators movable in at least one degree of freedom which are formed as hands which are actuated by means of an actuation element. Furthermore a control device is provided by means of which the actuation element or the actuation elements may be activated such that the direction indicators may be orientated into a spatial direction to be denoted.

DE 10 2007 053 470 A1 and US 2008/0119994 A1 disclose a vehicle user assist system for detecting a condition of a user and for controlling operations of vehicle devices in a manner desirable for the user. Thereby a physical and mental state is reflected by separately adding biological user characteristics information to standard reference information.

DE 10 2005 058 227 A1 and US 2006/0149428 A1 disclose an emotion based software robot for automobiles, in which the emotions of a driver and his/her behavior caused by such an emotion are assumed and expected when input data, for example conditions, orders and behaviors of a driver, automobile situations, surroundings situations of the automobile and so forth are identified.

WO 99/54015 and U.S. Pat. No. 6,959,166 B1 disclose a toy comprising a unusual physical appearance, a loudspeaker integrated into the toy, a input device, a user information storage unit for storing information corresponding to at least one user, and a control for reacting to user input and to information stored in the storage unit, and for speech output to the user.

SUMMARY

According to various embodiments, the operation of a motor vehicle can be improved. Furthermore, according to various embodiments, the concentration of a driver of a motor vehicle can be enhanced. At the same time, however, it may be desirable to avoid distraction of the driver of a motor vehicle. According to various embodiments, disadvantages resulting from the subject matter of prior art, in particular from DE 10 2007 037 073 A1 can be avoided.

According to an embodiment, a three-dimensional corporal figure for communicating with a passenger in a motor vehicle may comprise a touch-sensitive area for identifying a contact with the figure.

According to a further embodiment, the touch-sensitive area can be arranged in an upper portion of the figure. According to yet a further embodiment, the touch-sensitive area can be at least arranged at the highest point of the figure. According to yet a further embodiment, the figure may not comprise autonomously movable extremities. According to yet a further embodiment, the figure may have a height being less than the width of the figure. According to yet a further embodiment, the width of the figure can be 1.5 times to 3 times the height of the figure. According to yet a further embodiment, the figure may further comprise a display; and a control for displaying variable facial expressions on the display.

According to another embodiment, a three-dimensional corporal figure for communicating with a passenger in a motor vehicle does not comprise autonomously movable extremities.

According to a further embodiment, the figure may have a height which is less than the width of the figure. According to a further embodiment, the width of the figure can be 1.5 times to 3 times the height of the figure. According to yet a further embodiment, the figure may further comprise a display; and a control for displaying variable facial expressions on the display.

According to yet another embodiment, a three-dimensional corporal figure for communicating with a passenger in a motor vehicle may have a height which is less than the width of the figure. According to a further embodiment, the width of the figure can be 1.5 times to 3 times the height of the figure. According to yet a further embodiment, the figure may further comprise a display; and a control for displaying variable facial expressions on the display.

According to another embodiment, a three-dimensional corporal figure for communicating with a passenger in a motor vehicle may comprise a display; and a control for displaying variable facial expressions on the display.

According to yet another embodiment, a motor vehicle may comprise a sensor for measuring an operational state of the motor vehicle; a three-dimensional corporal figure for communicating with a passenger in the motor vehicle, wherein the figure is detachably locked in place in the motor vehicle; and a communications link for transmitting the operational state of the motor vehicle measured by means of the sensor to the figure.

According to a further embodiment, the figure may further comprise a touch-sensitive area for recognizing a contact with the figure. According to yet a further embodiment, the touch-sensitive area can be arranged in an upper region of the figure. According to yet a further embodiment, the touch-sensitive area can be at least arranged at the highest point of the figure. According to yet a further embodiment, the figure may not comprise autonomously movable extremities. According to yet a further embodiment, the figure may have a height which is less than the width of the figure. According to yet a further embodiment, the width of the figure can be 1.5 times to 3 times the height of the figure. According to yet a further embodiment, the figure may further comprise a display; and a control for displaying variable facial expressions on the display.

DETAILED DESCRIPTION

Figure 1:
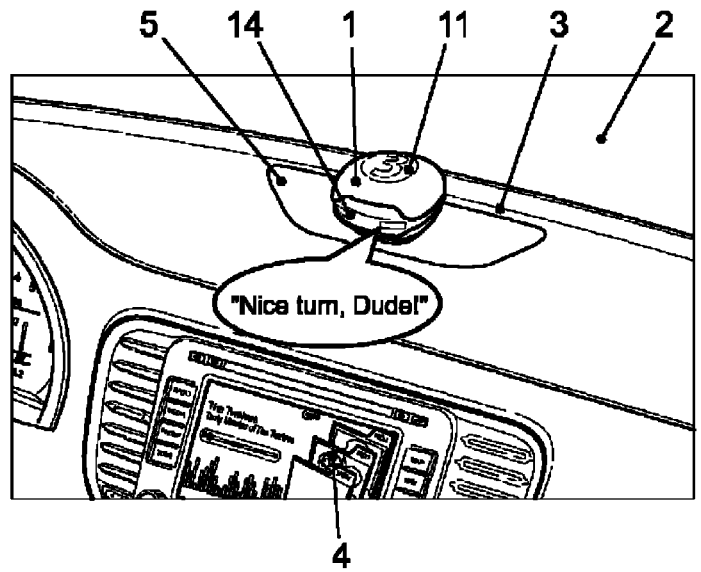
FIG. 1 shows an exemplary embodiment in a partial inside view of a motor vehicle comprising a three-dimensional corporal figure locked in place therein.

The aforementioned goal is reached by a three-dimensional corporal figure for communicating with a passenger in a motor vehicle, wherein it is in particular provided for that the figure comprises a touch-sensitive area for recognizing a contact with the figure.

A three-dimensional corporal figure in the sense of the invention in particular is an avatar. In particular it is to be provided for that the terms figure and avatar are to be comprehended as synonymous. A three-dimensional corporal figure in the sense of the invention in particular has a particularly lens-shaped rounded housing. A three-dimensional corporal figure in the sense of the invention in particular has at least one pedestal.

In particular it may be provided for that a three-dimensional corporal figure in the sense of the invention has a loudspeaker, a microphone, a data interface to a motor vehicle, a wireless communication interface for communicating with another figure, a positioning system, an acceleration sensor and/or a navigation system. In particular it is provided for that by means of a control of the three-dimensional corporal figure speech outputs may be carried out via a loudspeaker of the three-dimensional corporal figure. In particular these are carried out in a coordinated manner using an activation of a display of the three-dimensional corporal figure, so that it is in particular provided for that a mimic or a facial expression displayed by means of the display of the three-dimensional corporal figure corresponds with a speech output which is output by means of the loudspeakers of the three-dimensional corporal figure.

It may be provided for that by means of a three-dimensional corporal figure in the sense of the invention output signals of one or more acceleration sensors may be used to identify and to classify, respectively, the driving behaviour, to detect strong braking actions or acceleration actions, to determine the road surface characteristics or the lateral acceleration forces in curves and in particular to comment these.

A three-dimensional corporal figure in the sense of the invention in particular may comprise a temperature sensor, a humidity sensor, a brightness sensor as well a as further sensors, if applicable. Temperature, humidity and light sensors may for example be used to determine actual weather and driving conditions. A three-dimensional corporal figure in the sense of the invention may comprise a Bluetooth interface and/or a connection to a CAN-Bus located in the motor vehicle. By means of the Bluetooth interface a communication with mobile phones or other mobile devices may be established.

A three-dimensional corporal figure in the sense of the invention may comprise algorithms and learning algorithms, respectively, which allow detecting actions of the motor vehicle, the destination of a trip, the mental state of a driver and the like. In order to detect the actual state of the driver for example a system may be provided as disclosed in DE 10 2007 053 470 A1 and US 2008/0119994 A (incorporated by reference).

In particular it may be provided for that a three-dimensional corporal figure in the sense of the invention comprises a selectable personality. Thereby, in particular it may be provided for that the personality may be configured by means of a computer. When, for example, the three-dimensional corporal figure is programmed such that it comprises a serene personality it may be provided for that it tells jokes and anecdotes if the motor vehicle is caught in a traffic jam or is delayed. When the three-dimensional corporal figure is provided with and configured accordingly, respectively, with an informative personality it may be provided for that it outputs security proposals based on the driving behaviour or recommendations how the fuel efficiency could be improved. In particular it may be provided for that the activities of the three-dimensional corporal figure may be stopped by an acoustic command such as for example "be quiet" and "go to sleep".

In a further embodiment it is provided for that the figure comprises a touch-sensitive area for detecting a contact to the figure. In a further embodiment the touch-sensitive area is arranged in an upper area of the figure. In a further embodiment the touch-sensitive area at least is arranged at the highest position of the figure. The reference "upper and lower" results form the corporal embodiment of the three-dimensional figure and its intended orientation and arrangement, respectively, in a motor vehicle. An upper area of the three-dimensional corporal figure in particular comprises the upper half of the three-dimensional corporal figure. The highest point in the sense of the invention relates to the highest point of the three-dimensional corporal figure at its intended orientation and arrangement, respectively, in a motor vehicle. In particular it is provided for that the touch-sensitive area acts together with control in order to identify stroking, rubbing or certain gestures.

In a further embodiment the figure does not comprise (autonomously) movable extremities.

In a further embodiment the figure has a height which is less than the width of the figure. The height of the three-dimensional corporal figure in the sense of the invention in particular is its vertical extension at the intended orientation and arrangement, respectively, in motor vehicles. The width of the three-dimensional corporal figure in the sense of the invention in particular is its maximum horizontal extension at the intended orientation and arrangement, respectively, in a motor vehicle. The height of the three-dimensional corporal figure in particular relates to a direction/orientation which is orthogonal in relation to the direction/orientation to which the width of the three-dimensional corporal figure relates. In a further embodiment the width of the figure is 1.5 times to 3 times the height of the figure.

In a further embodiment the figure in addition comprises a display and a control for displaying variable facial expressions on the display.

In particular it is provided for that a communication of a passenger and a driver, respectively, of a motor vehicle with the three-dimensional corporal figure is carried out acoustically and/or haptic and that a communication from the three-dimensional corporal figure to a driver or passenger of the motor vehicle is carried out optically and/or acoustically.

The aforementioned goal is reached by a three-dimensional corporal figure for communicating with a passenger in a motor vehicle and in particular comprising one or several of the aforementioned characteristics, wherein the figure does not comprise autonomously movable extremities. In an embodiment the figure has a height which is less than the width of the figure. In a further embodiment the width of the figure is 1.5 times to 3 times the height of the figure. In a further embodiment the figure in addition comprises a display and a control for displaying variable facial expressions on the display.

The aforementioned goal is reached by a three-dimensional corporal figure for communicating with a passenger in a motor vehicle and in particular comprising one or several of the aforementioned characteristics, wherein the figure has a height which is smaller than the width of the figure. In a further embodiment the width of the figure is 1.5 times to 3 times the height of the figure. In a further embodiment the figure in addition comprises a display and a control for displaying variable facial expressions on the display.

The aforementioned goal is reached by a three-dimensional corporal figure for communicating with a passenger in a motor vehicle and in particular comprising one or several of the aforementioned characteristics, wherein the figure comprises a display and a control for displaying variable facial expressions on the display.

The aforementioned goal is reached by a motor vehicle, wherein the motor vehicle comprises a sensor for measuring an operational state of the motor vehicle and a three-dimensional corporal figure for communicating with a passenger in the motor vehicle and in particular comprising one or several of the aforementioned characteristics, wherein the figure is locked in place in the motor vehicle detachably, and wherein a communications link is provided for transmitting the operational state of the motor vehicle measured by means of the of the sensor to the figure.

In an embodiment the motor vehicle comprises a mechanical receptacle by means of which the figure may be locked in place detachably in the motor vehicle. It is in particular provided for that the clamping device is provided on the dashboard of the motor vehicle, in particular between the seats of driver and co-driver.

The aforementioned goal is reached by a method for operating a motor vehicle in particular comprising one or several of the aforementioned characteristics, wherein the motor vehicle comprises a sensor for measuring an operational state of the motor vehicle, for example the speed of the motor vehicle, and a three-dimensional corporal figure for communicating with a passenger in the motor vehicle in particular comprising one or several of the aforementioned characteristics, wherein the figure is locked in place detachably in the motor vehicle and wherein an operational state of the motor vehicle measured by means of the sensor is transferred to the figure.

A motor vehicle in the sense of the invention in particular is a land craft for individual use in road traffic. Motor vehicles in the sense of the invention in particular are not limited to land crafts comprising an internal combustion engine.

Further advantages and details result from the following description of exemplary embodiments.

FIG. 1 shows an exemplary embodiment of a motor vehicle 2 in a partial inside view. Thereby, reference numeral 4 indicates a display and operating device of the motor vehicle 2. Provided above the display and operating device 4 of the motor vehicle 2 and on the dashboard 3 is a clamping device 5 in which the three-dimensional corporal FIG. 1 is locked in place detachably.

Figure 2:
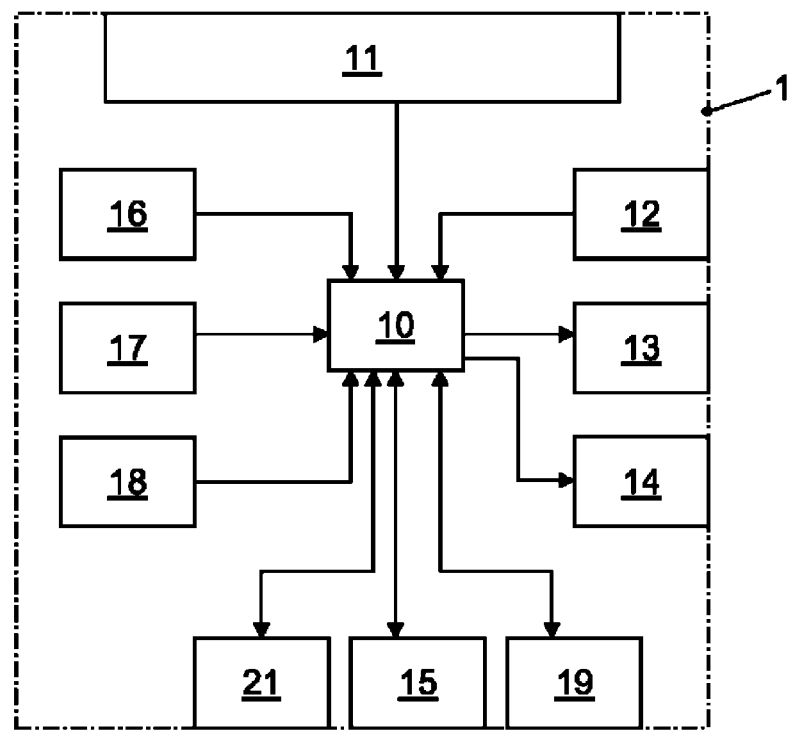
FIG. 2 shows a functional schematic diagram of a three-dimensional corporal figure depicted in FIG. 1.

FIG. 2 shows the three-dimensional corporal FIG. 1 in a functional schematic diagram. The three-dimensional corporal FIG. 1, subsequently also denominated as FIG. 1, comprises a control 10 and—in the upper part of FIG. 1—a touch-sensitive area 11 for analyzing touches to the touch-sensitive area 11. By means of the touch-sensitive area 11 a user, for example a driver of the motor vehicle 2, may interact with the three-dimensional corporal FIG. 1. The three-dimensional corporal FIG. 1 in addition comprises a microphone 12, a loudspeaker 13 and a display 14 by means of which in coaction with the control 10 in particular different facial expressions for communicating with a passenger and a driver, respectively, of the motor vehicle 2 may be created. Examples for different facial expressions are for example shown in FIG. 1, FIG. 3, FIG. 5 and FIG. 6.

The FIG. 1 in addition comprises one or several acceleration sensors 16, optionally a positioning system 17 and further sensors 18. In addition a USB interface 19 is provided by means of which the energy supply and a charging of an electrical energy storage (not shown) of the three-dimensional corporal FIG. 1, respectively, is carried out. Furthermore the three-dimensional corporal FIG. 1 comprises a wireless interface 15, which for example may be designed as a Bluetooth interface. By means of the Bluetooth interface 15 a communication may be carried out with the motor vehicle 2 or other mobile devices. Furthermore, an interface 21 is provided by means of which it may be communicated in a wireless manner with other figures which are formed according to the three-dimensional corporal FIG. 1.

Figure 3:
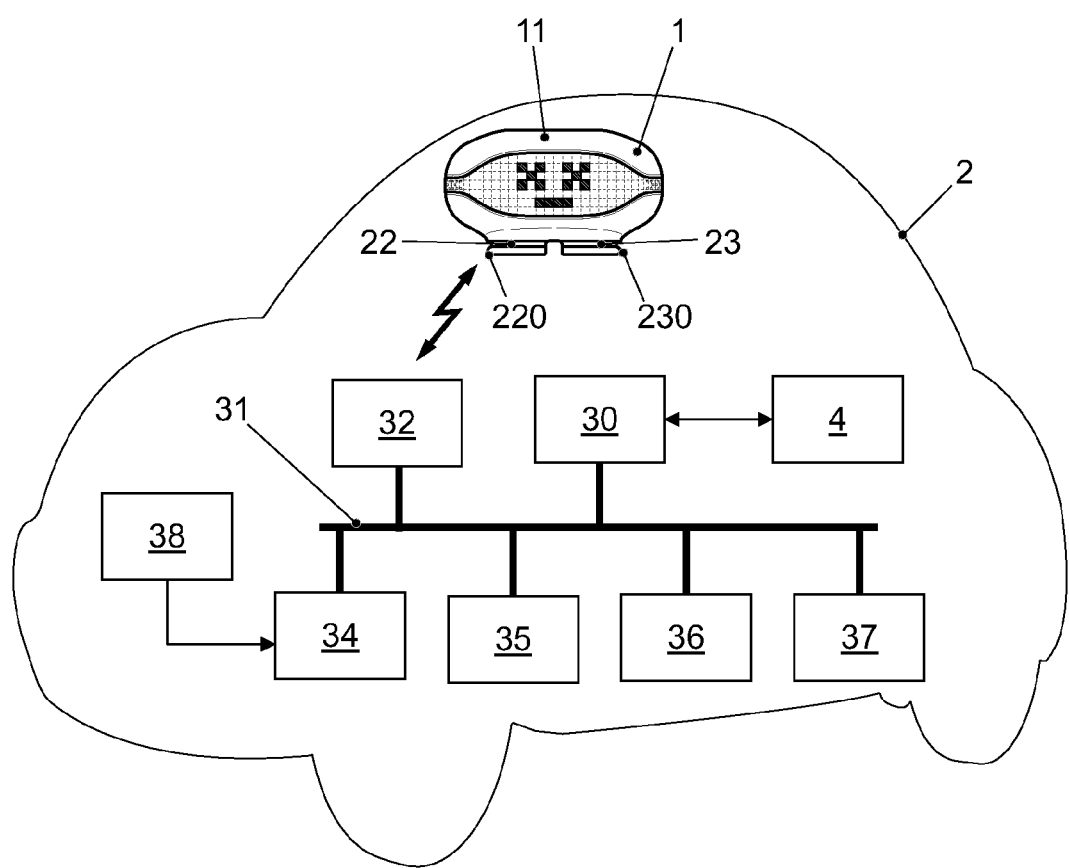
FIG. 3 shows the motor vehicle according to FIG. 1 in an exemplary functional schematic diagram.

The three-dimensional corporal FIG. 1—as can be seen in FIG. 3—is flattened in its upper portion in which the touch-sensitive area 11 is provided. Furthermore, the three-dimensional corporal FIG. 1 comprises two pedestals 22 and 23 for clamping the three-dimensional corporal FIG. 1 in the clamping device 5 of the motor vehicle 2. For this purpose, each pedestal 22 and 23 comprises a salient 220, 230.

FIG. 3 shows the motor vehicle 2 in an exemplary schematic diagram. The motor vehicle 2 amongst other things comprises a display and operating control 30, by means of which the display and operating device 4 may be activated and is coupled with a bus system 31. By means of the display and operating device 4 and the display and operating control 30, respectively, for example a navigation system 35 of the motor vehicle 2, an automatic climate control 36 of the motor vehicle 2 and an infotainment system 37 of the motor vehicle 2 may be operated.

Reference numeral 34 indicates a vehicle control by means of which for example sensors 38 located in the vehicle may be analyzed. The sensors 38 located in the vehicle may for example be sensors for an ASP system, an ASR system or an ESP system or a steering angle sensor. Furthermore the motor vehicle 2 comprises an interface 22 by means of which—in particular by means of the interface 15—a wireless communication with the three-dimensional corporal FIG. 1 may be carried out. The sensors 38 located in the vehicle and the combination of sensors 38 located in the vehicle and the vehicle control 34 represent an exemplary embodiment of sensors for measuring operating conditions of a motor vehicle in the sense of the claims.

Figure 4:
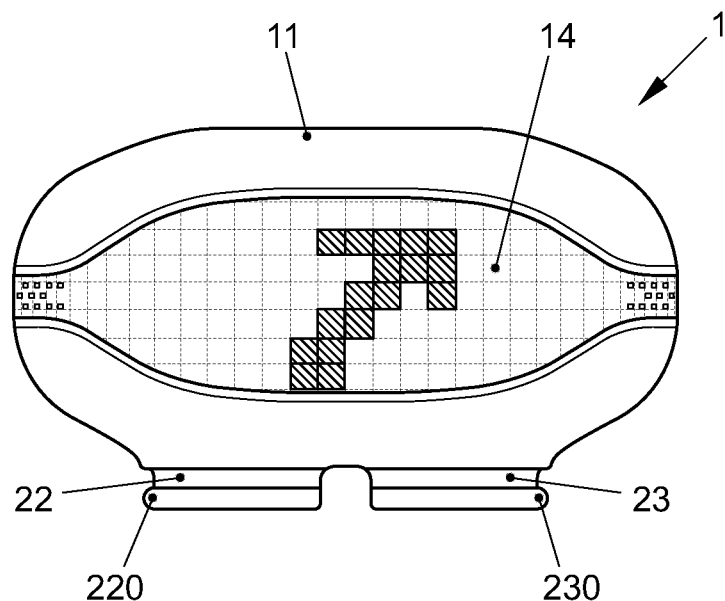
FIG. 4 shows an exemplary embodiment of a three-dimensional corporal figure according to FIG. 1 during representation of a directional arrow.
Figure 5:
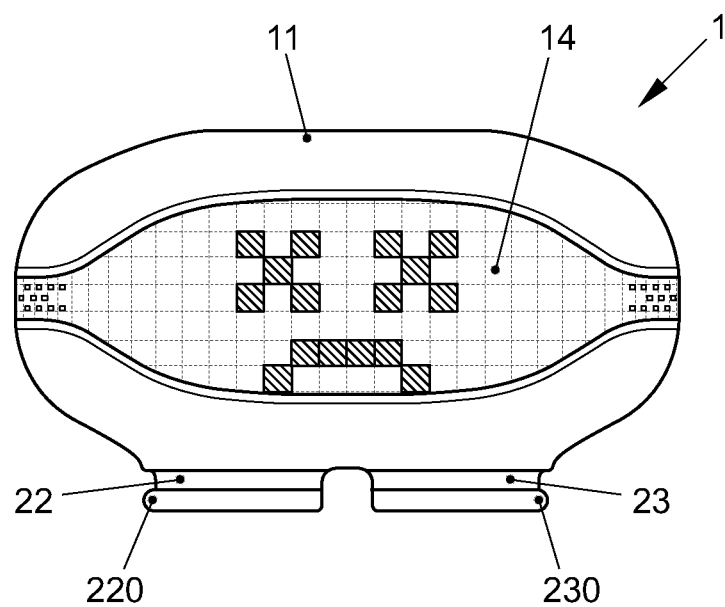
FIG. 5 shows an exemplary embodiment of a three-dimensional corporal figure according to FIG. 1 during representation of disapproval.

It is in particular provided for that by means of the control 10 speech outputs may be carried out via the loudspeaker 13. These in particular are carried out in a coordinated manner together with an activation of the display 14 so that it is provided for in particular that a mimic or a facial expression displayed by means of the display 14 corresponds with a speech output which is output by means of the loudspeaker 13. If for example the speech output "Five more minutes to go" is carried out by means of the loudspeaker 13 then a direction arrow in the direction of the destination is displayed by means of the display 14 as depicted in FIG. 4 as an example. If for example the speech output "We are 20 MPH over speed-limit. You are making me nervous!" is carried out by means of the loudspeaker 13 then a facial expression expressing disapproval is displayed by means of the display 14 as depicted in FIG. 5 as an example. For this purpose it is provided for in the present exemplary embodiment that the corners of the mouth of the facial expression are drawn downward.

It may be provided for that different personalities may be assigned to the three-dimensional corporal FIG. 1 so that the three-dimensional corporal FIG. 1 depending on personality reacts differently to certain situations and/or input and entries of a user, respectively. When the three-dimensional corporal FIG. 1 for example is programmed such that it comprises a cheerful personality it may be provided for that it tells jokes and anecdotes if the motor vehicle is caught in a traffic jam or is delayed. When the three-dimensional corporal FIG. 1 is supplied with a informative personality and is configured accordingly, respectively, it may be provided for that it outputs security recommendations which are based on the driving style or recommendations on how the fuel efficiency could be improved.

Figure 6:
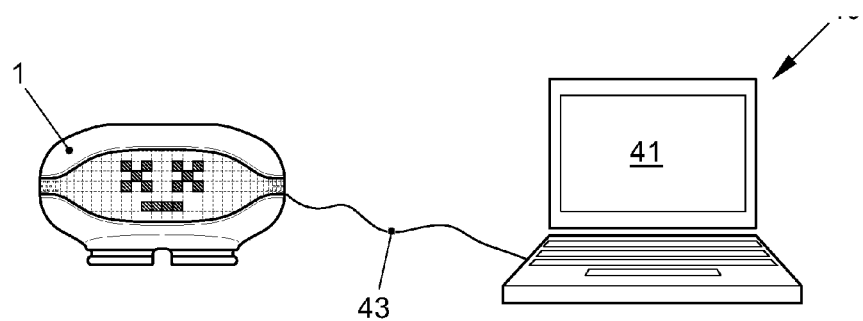
FIG. 6 shows a connection of a three-dimensional corporal figure according to FIG. 4 with a computer.
Figure 7:
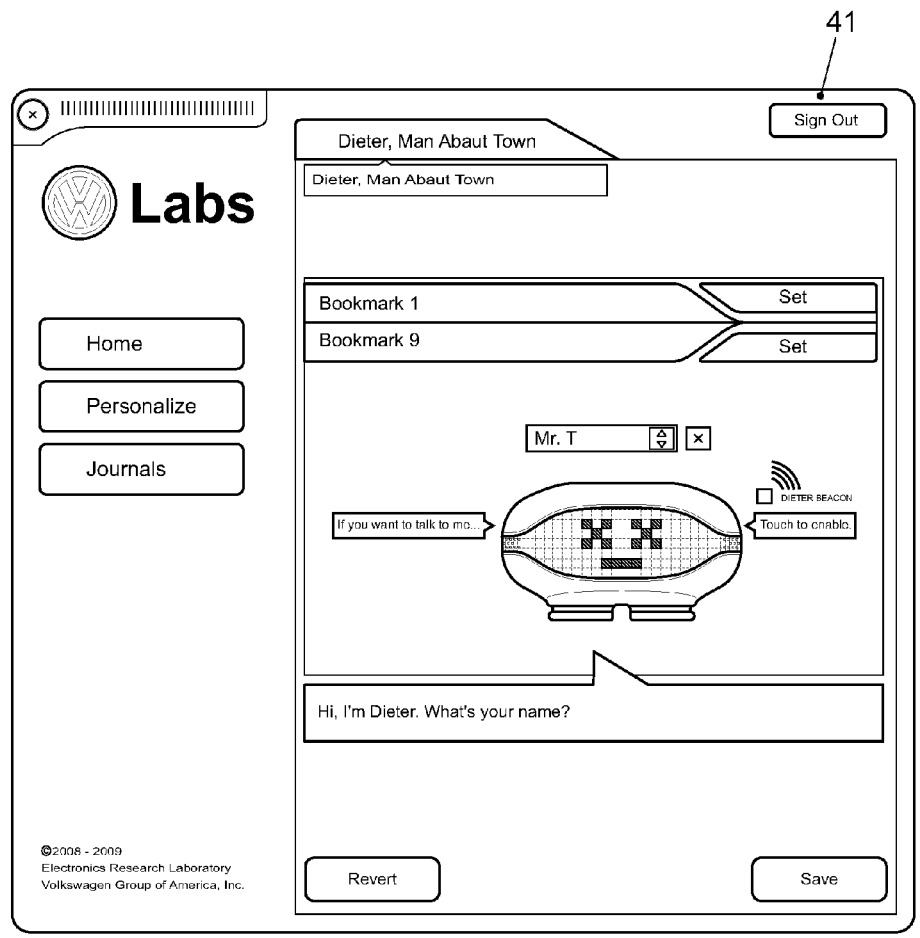
FIG. 7 shows an exemplary embodiment of a homepage for configuring a three-dimensional corporal figure according to FIG. 1.

In order to change the personality of the three-dimensional corporal figure it may be provided for that the three-dimensional corporal FIG. 1—as depicted in FIG. 6 in an exemplary manner—is connected to a PC 40, in particular by means of a USB cable 43 which also serves as means for an energy supply. By means of the PC 40 it is feasible to select a number of predefined personalities via an Internet interface or to create an own personality by means of the Internet interface. FIG. 7 shows a computer display 41 during a representation of an exemplary homepage for configuring the three-dimensional corporal FIG. 1.

REFERENCE NUMERALS 1 three-dimensional corporal figure/Avatar
2 motor vehicle
3 dashboard
4 display and operating device
5 clamping device
10 control
11 touch-sensitive area
12 microphone
13 loudspeaker
14 display
15 Bluetooth interface
16 acceleration sensor
17 navigation system
18 further sensors
19 USB interface
21 interface by means of which it may be communicated with other figures in a wireless manner
22, 23 pedestal
30 display and operating control
31 bus system
32 interface
34 vehicle control device
35 navigation system
36 automatic climate control
37 infotainment system
38 sensors located in the vehicle
40 computer
41 computer display
43 USB cable
220, 230 salient

The invention claimed is:

1. A three-dimensional corporal figure for communicating with a passenger in a motor vehicle, the figure comprising:
a portable three-dimensional body including a rounded housing having three-dimensional contours,
a touch-sensitive area of the portable three-dimensional body for identifying a contact with the three-dimensional body of the figure via a haptic control, the touch-sensitive area arranged on a flattened portion of the rounded housing;
a display, separate from the touch-sensitive area;
a wireless interface device configured to wirelessly receive motor vehicle data from a corresponding wireless interface device of the motor vehicle, the motor vehicle data comprising data detected by the motor vehicle regarding operating conditions of the vehicle, and
a control device configured to:
dynamically select a facial expression based at least on motor vehicle data wirelessly received from the motor vehicle, and
display the dynamically selected facial expressions on the display; and
wherein the portable three-dimensional corporal figure maintains a constant shape during operation and comprises autonomously unmoveable extremities.

2. The figure of claim 1, wherein the touch-sensitive area is arranged in an upper portion of the figure.

3. The figure of claim 1, wherein the touch-sensitive area is at least arranged at the highest point of the figure.

4. The figure of claim 1, wherein the figure has a height being less than the with of the figure.

5. The figure of claim 1, wherein the width of the figure is 1.5 times to 3 times the height of the figure.

6. A motor vehicle, the motor vehicle comprising:
a sensor for measuring an operational state of the motor vehicle;
a portable three-dimensional corporal figure including a rounded housing for communicating with a passenger in the motor vehicle via a haptic control, wherein the figure is detachably mounted in the motor vehicle;
a touch-sensitive area of the portable three-dimensional corporal figure for identifying a contact with the three-dimensional body of the figure, the touch-sensitive area arranged on a flattened portion of the rounded housing; and
a wireless communications link between a wireless interface device of the motor vehicle and a wireless interface device of the figure for transmitting the operational state of the motor vehicle measured by the sensor to the figure;
wherein the figure comprises:
a display separate from the touch-sensitive area; and
a control device configured to:
dynamically select a facial expression based at least on the operational state of the motor vehicle received from the motor vehicle via the wireless communications link; and
display the dynamically selected facial expressions on the display; and
wherein the portable three-dimensional corporal figure maintains a constant shape during operation and comprises autonomously unmoveable extremities.

7. The figure of claim 6, wherein the touch-sensitive area is arranged in an upper region of the figure.

8. The figure of claim 6, wherein the touch-sensitive area is at least arranged at the highest point of the figure.

9. The figure of claim 6, wherein the figure has a height which is less than the width of the figure.

10. The figure of claim 9, wherein the width of the figure is 1.5 times to 3 times the height of the figure.

11. A portable three-dimensional corporal figure for communicating with a passenger in a motor vehicle, the figure comprising:

a portable three-dimensional body including a rounded housing having three-dimensional contours and configured for mounting in the motor vehicle, a touch-sensitive area of the portable three-dimensional body for identifying a contact with the three-dimensional body of the figure, the touch-sensitive area arranged on a flattened portion of the rounded housing;

a display separate from the touch-sensitive area of the portable three-dimensional body configured to dynamically display a variety of different facial expressions based on at least one of user input and detected data regarding operating conditions of the vehicle, wherein the user input comprises a haptic input, and a wireless interface device configured to wirelessly communicate with other portable three-dimensional corporal figures.

12. A portable three-dimensional corporal figure for communicating with a passenger in a motor vehicle, the figure comprising:

a portable three-dimensional body including a rounded housing having three-dimensional contours and configured for mounting in the motor vehicle, a touch-sensitive area of the portable three-dimensional body for identifying a contact with the three-dimensional body of the figure, the touch-sensitive area arranged on a flattened portion of the rounded housing;

a display separate from the touch-sensitive area of the portable three-dimensional body configured to dynamically display a variety of different facial expressions based on at least one of user input and detected data regarding operating conditions of the vehicle, wherein the user input comprises a haptic input, and a wireless interface device configured to wirelessly communicate with other wireless mobile devices.

13. The figure of claim 12, wherein the wireless interface device configured to wirelessly communicate with other wireless mobile devices comprises a Bluetooth interface.

* * * * *